Aug. 12, 1947.          W. H. GREEN          2,425,371
APPARATUS AND PROCESS FOR IMPROVING SEPARATION OF CLARIFIED LIQUID
FROM A SLURRY BY SUBDIVIDING THE SLURRY AT THE SEPARATION
INTERFACE INTO A PLURALITY OF SHALLOW STREAMS
Filed Jan. 7, 1943          3 Sheets-Sheet 1

INVENTOR.
Walter H Green,
BY

INVENTOR.
Walter H. Green,
BY

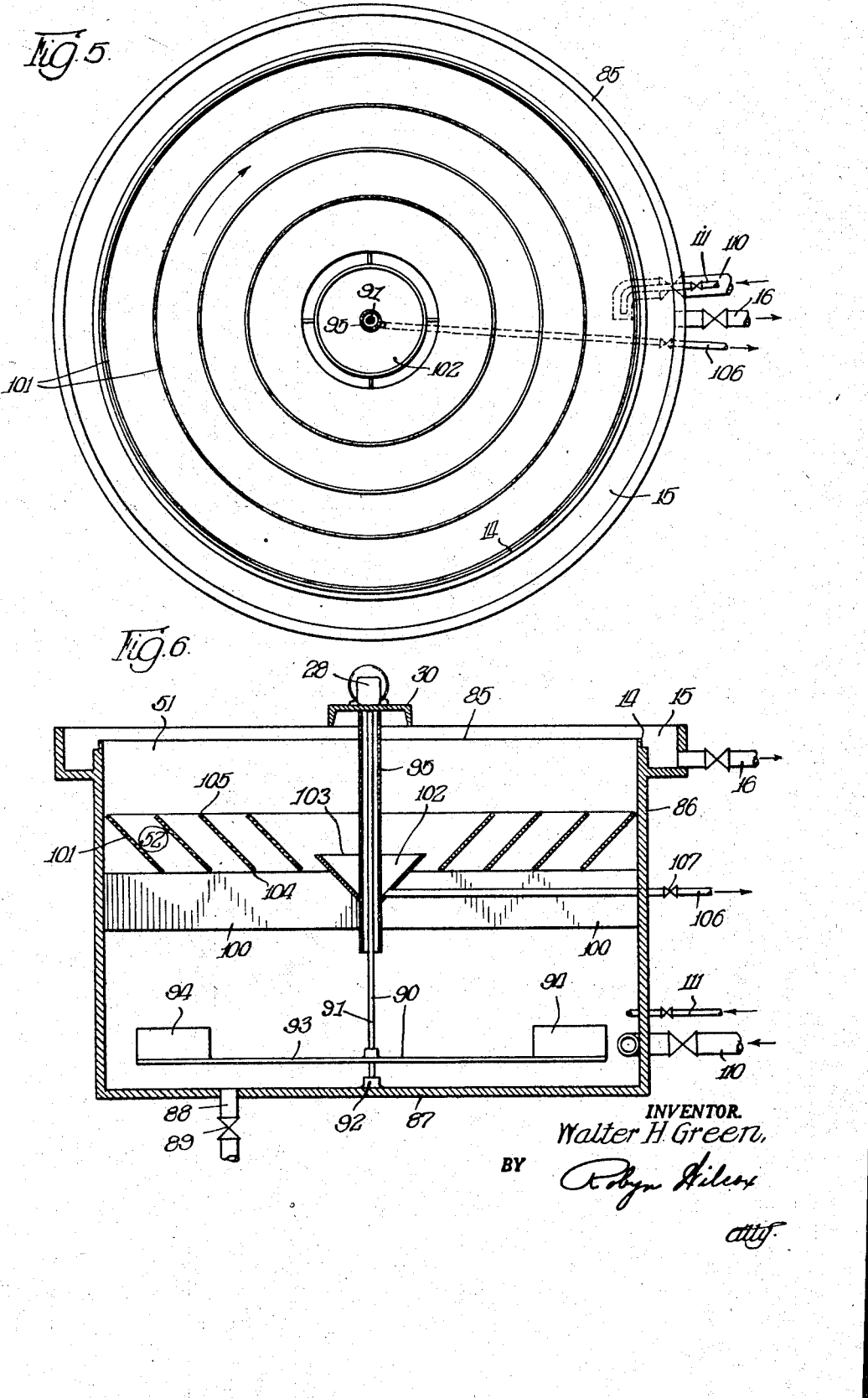

Patented Aug. 12, 1947

2,425,371

UNITED STATES PATENT OFFICE 2,425,371

APPARATUS AND PROCESS FOR IMPROVING SEPARATION OF CLARIFIED LIQUID FROM A SLURRY BY SUBDIVIDING THE SLURRY AT THE SEPARATION INTERFACE INTO A PLURALITY OF SHALLOW STREAMS

Walter H. Green, Batavia, Ill., assignor to Infilco Incorporated, Chicago, Ill., a corporation of Delaware Application January 7, 1943, Serial No. 471,634

18 Claims. (Cl. 210—16)

This invention relates to an improved method and apparatus for the treatment of aqueous liquids, such as the softening or clarification of water.

One of the principal objects of the present invention is an improved process and apparatus for the softening of a hard, or the clarification of a turbid, water.

Another object of the present invention is an improvement upon the slurry process in the treatment of water.

A further object of the invention is to provide in the slurry treatment of water, an improved means for separating clarified water from the upper surface of the slurry pool, and for rapid removal from such surface of solids accumulating thereat due to the separation of clarified water from the slurry.

Another object of the invention is to provide an improved process and apparatus for the purification of water by a method wherein the water is treated with a precipitating reagent to precipitate impurities therefrom and the subsequent separation of said precipitate and water.

A still further object of the invention is the provision of an improved process and apparatus for the purification of water by chemical reaction in the presence of a large amount of slurry containing particles separated and accumulated from previously treated water while in a state of suspension, the reaction being controlled to produce large and heavy particles of the precipitate from which clarified water can rapidly be separated.

These and other objects of the invention will be apparent from the description and claims which follow.

In the field of water treatment, it has long been known to treat water with a chemical reagent, such as lime, in order to precipitate impurities from the water. For many years it was thought necessary to gently mix the water and reagent for a prolonged period in what is commonly called a "flocculation" step and then subject the treated water to a prolonged sedimentation step in which the water is held in a quiescent condition for a period of several hours, during which time the fine precipitate formed by the reaction of water and chemicals would settle out. This type of process required large tanks to accomplish the necessarily long holding time, as the precipitate formed by the reaction was very fine and required a long time to deposit from the water and also it was necessary to hold the water several hours to arrive at a sufficient state of chemical and physical stabilization. The mixing of chemical and water in the flocculation step necessarily was gentle as it was found that turbulent mixing destroyed the particles so formed while gentle mixing permitted their flocculation into larger particles which would settle more rapidly.

A more recent development in the field of water treatment has been that wherein the treatment is carried out in, and in part by, a suspension containing particles separated and accumulated from previously treated water to form a slurry. This slurry type treatment has within the last few years very largely displaced the old flocculation and sedimentation processes so far as new installations are concerned, and has been the subject of various patents such as those to Green Reissue No. 22,194, Spaulding 2,021,672 and Hughes 2,245,587. In the Green and Hughes patents particularly the water to be treated and the treating reagent are turbulently mixed in and with a slurry containing a large amount of solids separated and accumulated while in a suspended condition from a relatively large amount of previously treated water. The invention of the present application may to an extent be considered as directed to improvement on the apparatus of the above mentioned Green and Spaulding patents. It has been found that in such slurry treatments, the newly formed precipitate tends to deposit by accretion upon the particles already formed, particularly if there is sufficient movement of the water and solids forming the slurry to provide for a continuous flushing of the film of pure water which tends to form around the particles when the nascent precipitate has been removed therefrom, which film hinders contact of such particles with water containing nascent precipitate. The slurry treatment is quite new and presents many problems and difficulties not found in the prior art of flocculation and sedimentation. One of the most important problems arising in slurry treatment lies in the separation of clarified water from the slurry at the upper surface of the body of slurry. The solids formed in such a slurry treatment are so conditioned as to form relatively tough and dense particles from which clarified water may readily escape. However, with the escape of clarified water there is a correspondingly rapid abandonment and accumulation of solids at the slurry surface, which I have found tends to interfere with the process. My invention relates to an improved method and apparatus for securing the more rapid escape of clarified water from the upper surface of the body of slurry and the removal of the solids left behind by the escape of clear water, so as to continually present new slurry from which clear water can be displaced. Thus, one of the principal objects of my invention is to provide a method and apparatus whereby clarified water and solids may be rapidly and efficiently removed from the slurry at the upper surface of the body of slurry used in the treatment so that the separation of water from slurry can proceed rapidly and efficiently.

As a result of observation and consideration of such apparatus and processes as those of Green and of Spaulding referred to, and of other observations and tests, I have found that while favorable conditions have been provided for mixing and reacting the water and precipitating reagent in and with the slurry, the conditions provided for clarification can be greatly improved, so that to an extent what I now propose is of the nature of improvement on such apparatus and processes. I have discovered that by changing the conditions at and just below the slurry surface at, or from, which the clear water escapes substantial advantage can be obtained in the way of a very considerable increase in the rate of escape of clear water. I have found that solids abandoned at, or adjacent, the slurry surface, or accumulating there, interfere with the approach and escape of water there and that if these solids are removed the rate of escape may be substantially increased. In my copending application, Serial No. 471,635, filed January 7, 1943, I have proposed the washing away of these abandoned solids by a flow of, or in, the slurry adjacent the escape surface. That method is very effective but I have found that similar results may be had if instead of carrying the solids away in a circulation of slurry I provide means by which they may deposit on a solid surface without having to move far to reach that surface. In this way the interference effect is minimized. When I speak of interference effect I am not referring to a simple obstacle effect but of something more complex, involving factors, the relations of which I do not yet fully understand, such as for instance, the direction of approach of liquid and solids to the escape surface. Thus I have found that the greatest degree of interference generally occurs when the liquid flow is vertically to the escape surface in, or with, the slurry in an open area or chamber and least when the liquid or slurry is delivered substantially horizontally to, or just below, the escape surface as referred to in the above copending application. I now find that while great benefit can be had if the slurry rising from below passes between, or over, the deposit surfaces, additional advantage can be had if instead there is a lateral delivery or flow between, or over, these surfaces.

I have found that the separation of water and solids from the slurry can be most readily secured by dividing the slurry in the upper portion of a body of slurry into a plurality of thin streams by relatively narrow sloping plates intersecting the upper surface of the body of slurry. The direction of flow of these thin streams, as they rise to the slurry surface, has a horizontal component greater than its vertical, for flow is preferably lengthwise along the blades as well as across them, and this type of flow, for the sake of brevity, will sometimes be spoken of as "diagonally rising." When the upper portion of the body of slurry is so divided into the thin streams above mentioned, the solids left behind upon the escape of clear water will readily deposit, without having to travel far, upon the sloping plates and thereby be quickly removed from that portion of the body of slurry where they otherwise tend to accumulate and interfere with the rapid escape of clear water. Such deposited solids will slide down the plate and be resuspended in the body of slurry below, but they are removed from that portion of the process where they are not needed. Preferably the plates are so placed as to provide streams of the order of about 6 to 12 inches thick and of a vertical height about two to four times the thickness of the stream. The distance between the plates and their vertical width is not closely critical and can be increased or decreased according to the conditions of treatment, but under ordinary circumstances little is gained by putting them closer for the conditions that exist in the confined sloping space between them are not as simple as in an open space. As the plates are spaced farther apart the advantages gained decrease but not necessarily proportionately, and may still be very substantial, and particularly so with some precipitates. However, it has been found that as the distance between the plates is increased, the height should be increased proportionally as the thicker the stream of slurry the longer it takes the solids separated from water at the surface to be removed from slurry at the slurry face. I prefer to use plates sloping at an angle of approximately 45° or a little more, as that is an angle which will permit the solids depositing on the plates to slide down into the body of slurry below. While plates sloping at a steeper angle can be used, it has been found that as the plates slope more steeply they afford less benefit, thereby increasing the number required and the cost of the apparatus.

The vertical height of the plates should, as noted above, be substantially more than their horizontal spacing. They are desirably at least of such height that the solids abandoned between them can descend vertically to a plate surface. Conditions should be established so that the slurry surface can be maintained between them. When they are fed from below, the slurry surface may vary somewhat in elevation, and this may make it desirable to make them vertically wider, but extreme width is rather to be avoided because then deposited solids stay longer on them and must flow down a longer slope, which seems to be undesirable. When the slurry is fed in from the side or edge the slurry level can be more closely maintained.

The invention will be more readily apparent by reference to the drawings which form a part hereof and in which like reference characters designate similar elements.

Figure 1 discloses a plan view, with motor and supporting structure removed, of one embodiment of my invention.

Figure 2 discloses a horizontal cross-sectional view of the apparatus shown in Figure 1.

Figure 5 is a plan view of another embodiment of my invention, shown as applied particularly to the type of structure shown in my patent Re. No. 22,194.

Figure 6 is a vertical cross-sectional view of the apparatus shown in Figure 5.

Figure 1:
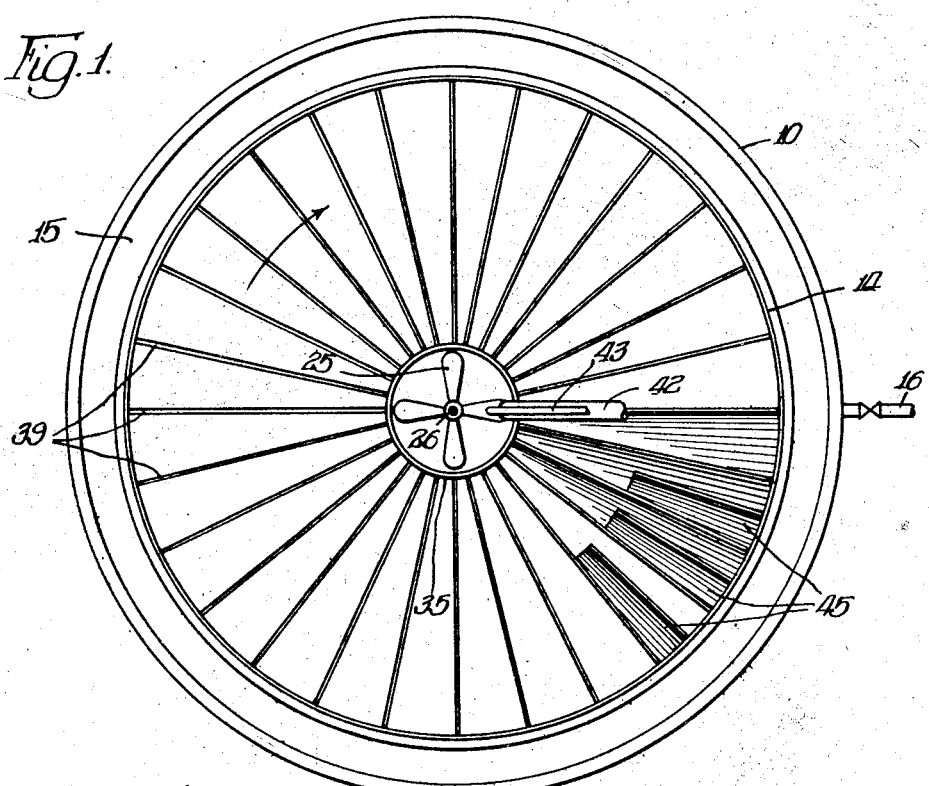
Figure 2:
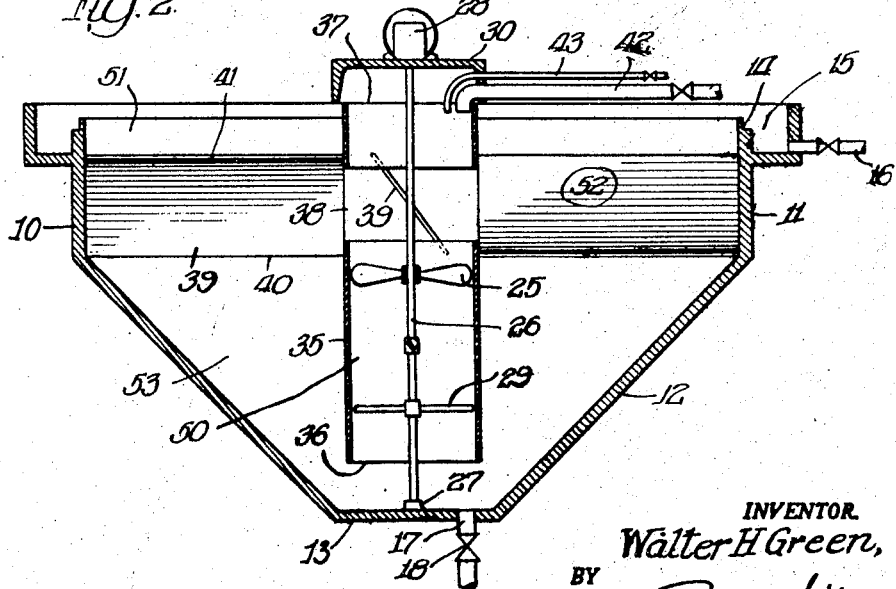

Referring to Figures 1 and 2, it will be seen that the apparatus of the present invention is enclosed in a tank 10 which may be of any size or shape but which may include a vertical wall 11, a hopper bottom 12, and a floor 13. The upper edge of the vertical wall 11 is provided with a weir 14, which separates the tank from a launder 15 from which the treated water may be withdrawn through an outlet conduit 16. The tank is also preferably provided with a drain 17 equipped with a valve 18 to control the flow therethrough, whereby the tank may be drained if desired, or part of the liquid within the tank may be removed from time to time.

Figure 4:
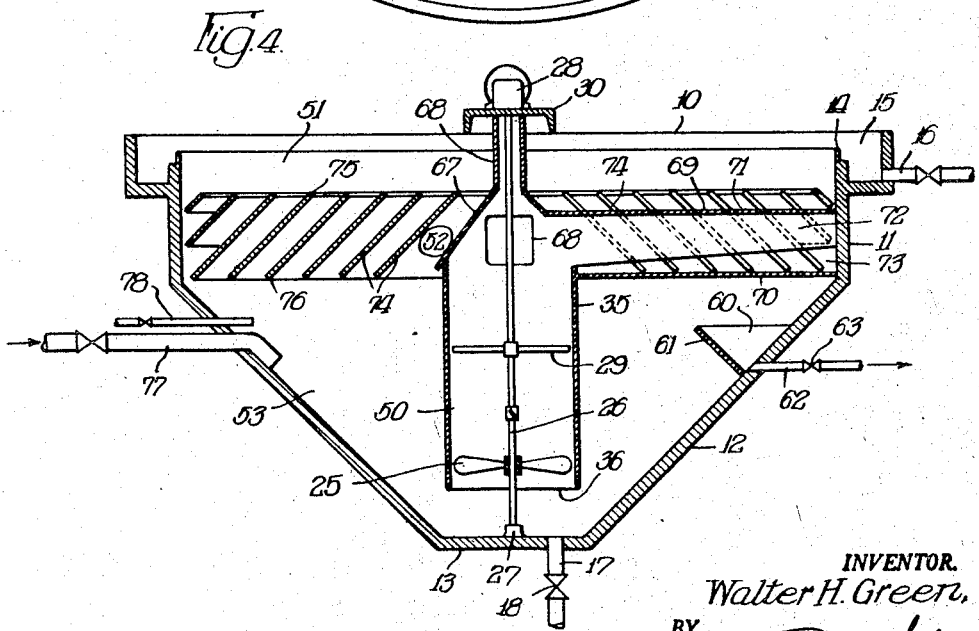
Figure 4 is a vertical cross-sectional view of the apparatus shown in Figure 3 along the vertical planes designated by the lines 4—4 of Figure 3.

Within the tank 10 I place a stream projecting impeller 25 mounted upon a shaft 26 which is journaled in suitable bearings, such as 27, and driven by a motor-reducer 28. The impeller 25 may be placed in various levels of the tank, in Figure 2 it is shown as being at an intermediate level while in Figure 4 it is shown as being adjacent the floor of the tank. The location will depend to some extent upon the direction of flow, which in Figure 2 is downwardly from the impeller and in Figure 4 is upwardly therefrom. If desired, agitating bars 29 may also be mounted upon the shaft 26 in order to secure a more thorough and turbulent mixing of liquid thereby. The motor reducer 28 is supported above the tank by beam 30.

Surrounding the impeller 25 is a partition or cylinder 35 extending upwardly from a level, such as 36, adjacent the floor of the tank and either extending above the liquid level in the tank, as shown at 37 in Figure 2, or provided with a plate, such as shown in Figure 4, or other means for preventing a flow within the partition from affecting quiescent conditions in the upper portion of the tank. At an intermediate level in the tank, the partition 35 is provided with openings 38 which may take the form of a continuous slot, as shown in Figure 2, or a plurality of individual openings 68 as shown in Figure 4. At the level of the communication 38 I provide a plurality of steeply sloping settling plates, which in Figures 1 and 2 are shown as longitudinal plates 39 extending radially from the partition 35 to the wall 11 of the tank. Preferably the plates will have a slope of 45°, or a little more so that solids depositing thereon will flow or slide by gravity downwardly and off the lower edge 40. The settling plates 39 must have a vertical extension at least to the upper edge of the communication 38, and should extend some distance above, say a distance about the same as the spacing of the plates 39 at the periphery of the cylinder 35. Preferably the top edge 41 will overlie the lower edge 40 of the adjoining plate in order to prevent direct passage of liquid from the lower portion of the tank into the quiescent upper portion. The plates 39 can be placed at any desired distance apart, and can have any desired vertical height, but I have found that plates about 4 to 12 inches apart and with a vertical height of about three times the distance between plates are very efficient. Obviously, where the plates are placed radially as herein described, the distance between the plates will vary as the distance from the center increases, which is permissible so long as the vertical height of the plates at the periphery is sufficient to permit the top edge 41 of one settling plate to well overlap the lower edge 40 of the adjacent one. In larger tanks it may be advantageous or necessary to put plates extending part way in from the periphery intermediate the others, as indicated at 45.

Water to be treated and a chemical reagent may be introduced in any desired manner. In the embodiment shown in Figures 1 and 2, in which the flow from the impeller 25 is downwardly through the cylindrical partition 35, I may introduce both into the upper portion of the cylinder 35. In this embodiment, water is shown introduced through inlet conduit 42 and chemical reagent through chemical feed line 43, both of which are shown as discharging into the open top of cylinder 35.

It will be seen that the structure herein described divides the tank 10 into a a mixing zone 50 defined by the cylindrical partition 35; an upper quiescent or clarified liquid zone 51 adjacent the upper portion of the tank; a clarification zone 52 within the upper and lower limits of the settling plates 39; and a flow space 53 in the lower portion of the tank and outside of the mixing zone. The mixing zone 50 and the flow space 53 together form what might be called a reaction space in the bottom of the tank 10, as ordinarily the reaction between water and reagent may take place in both the mixing zone and the flow space. This reaction space is functionally separated from the clarified liquid zone 51 by the sloping plates 39 or by the clarification zone 52 established by such plates.

The operation of the apparatus will be obvious. Assuming that the apparatus has been in operation and a body of slurry has been accumulated, which will extend from the floor 13 to a level intermediate the top and bottom of the settling plates 39, water and reagents are supplied through their respective inlet conduits 42 and 43 into the open upper end of the mixing zone 50. It will be understood that water and reagent may be supplied in various ways, such as dosing the water with reagent before entering the tank, discharging in separate and adjacent streams as preferred and shown, or, as discharging as separate streams in different parts of the tank such as supplying one in the flow space 53 and the other in the mixing space 50. Rotation of the impeller 25 causes a downward flow of considerable volume through the mixing zone 50 and out the lower open end 36 thereof, where it is deflected outwardly and upwardly. The horizontally expanding area of the lower portion of the tank will enable the rather vigorous flow issuing from the lower end 36 of the mixing zone 50 to gradually decrease in velocity so that it will be rising gradually and non-turbulently when it reaches the lower edge 40 of the settling plates 39. The direction of rotation of the propeller should be such that the rotation of the slurry in space 53 will be toward the back or lower side of plates 39 so as not to be caught and deflected upwardly between the plates. The vertical rise of water in the lower portion of the tank is then divided by the sloping plates into thin, diagonally rising, streams as it passes between the plates. The slurry level, which will be substantially horizontal entirely across the area of the tank, must be maintained at a point intermediate the lower edge 40 and upper edge 41 of the settling plates 39. This circulation tends to raise the slurry to a level about that of the top of opening 38 and unless the circulation or velocity is too great it will not go much higher unless solids are not discharged to waste in sufficient amount. In the clarification zone, established by the sloping settling plates, clarified water can escape from the slurry and the solids thereby left behind are rapidly removed from the slurry by depositing upon the sloping plates. The solids are thus removed from that portion of the slurry in which they usually tend to accumulate and in which such an accumulation tends to become detrimental. Such solids quickly flow or slide down the plates and are dispersed and resuspended in the slurry therebelow.

Preferably the impeller 25 will be of such size and rotated at such speeds as to cause a flow of liquid of about twice the throughput of water or more, so that part of the considerable amount of slurry starting to pass vertically between the plates will be drawn horizontally into the communication 38 and thereby returned to the mixing zone 50 and some of the solids abandoned by the escaping water will be carried back with the flow without being deposited on the plates. Excess solids can be withdrawn from the body of slurry in the lower part of the tank 10 by any suitable means such as through the drain 17, as shown in Figure 2, or through the sludge concentrator 60, shown in Figure 4.

It is believed to be obvious that the direction of flow through the mixing zone 50 can be reversed so that the flow would be upwardly therein and thence horizontally adjacent the sloping plates 39, and thence downwardly in the flow space 53 for recirculation. In this event the water and chemicals would preferably be introduced in the flow space 53 or in the lower part of the mixing zone 50 so as to provide a sufficient time for complete reaction between water and reagent and slurry before its discharge outwardly through communication 38.

Figure 3:
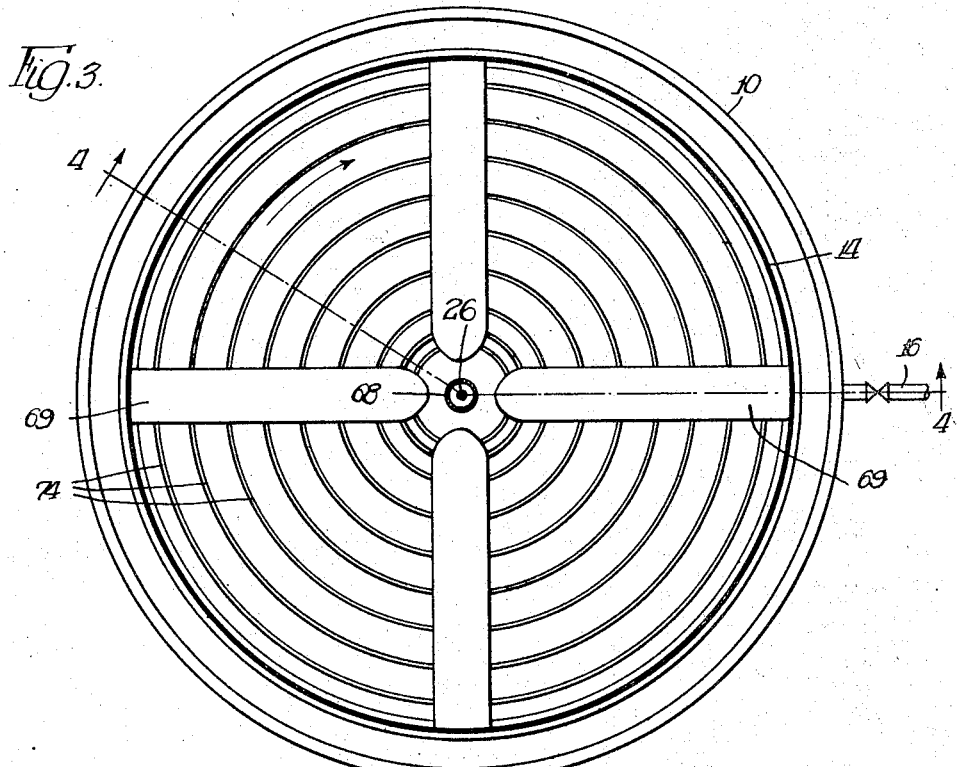
Figure 3 is a plan view, with motor and supporting structure removed, of a second embodiment of my invention.

In many respects the apparatus shown in Figures 3 and 4 is very similar to that shown in Figures 1 and 2. The general structure of the tank and the impeller and its associated shaft are the same as in Figures 1 and 2. However, in Figure 4 is shown a solids concentrating chamber 60 formed by a wall of the tank and a partition 61. A sludge outlet 62 leads from the lower portion of the concentrator chamber and preferably is provided with a valve 63 to control the removal of solids from the apparatus.

In the structure shown in Figures 3 and 4, the cylindrical partition 35 is provided with a top 67 from which extends a cylinder 68 surrounding the shaft 26. At the level of the intermediate clarification zone 52 the mixing chamber 50 is provided with a plurality of flow members, generally designated by 69, extending to the periphery of the tank. The flow members 69 should be so constructed as to permit the outflow of liquid therefrom horizontally on each side. For example the flow members 69 may comprise a floor plate 70, a cover plate 71, and be confined within side walls 72. The side walls 72 are provided with a slot 73 or other suitable apertures through which liquid can pass horizontally into the space between the settling plates 74, which are concentrically arranged around the cylindrical partition 35. As in the apparatus described in Figures 1 and 2, it is desired that the upper edge 75 of one settling plate overlie the lower edge 76 of the adjacent plate. It is also preferred that the plates be horizontally spaced a relatively short distance apart, such as 6 or 8 inches, and that the height of the plates be two to four times the horizontal distance between them.

Water to be treated and a chemical reagent can be introduced through raw water inlet 77 and chemical feed line 78 discharging into the flow space 53 or other suitable place as indicated above.

The operation of the structure shown in Figures 3 and 4 is essentially the same as that shown in Figures 1 and 2. For purposes of illustration it can be assumed that the flow is upwardly within the mixing zone 50. A volume of slurry is drawn by rotation of the impeller 25 upwardly through the mixing zone 50, preferably in an amount at least about twice that of the throughput of the treated water. The slurry passes through the flow members 69 and a portion of it will pass horizontally through the slots 73 into the spaces between the concentric sloping baffles and will maintain such horizontal flow for some distance. Clear water will escape from the upper surface of the slurry, which is preferably maintained within the limits of the upper edge 75 and the lower edge 76 of the settling plates 74, and part of the solids thereby left behind will quickly sediment upon the sloping plates 74 as a thin sludge that will quickly flow or slide down the baffle plates and be resuspended in the body of slurry below. In this fashion the solids which ordinarily accumulate at the surface of the slurry are temporarily removed from that locality and returned to the process. A large portion of the slurry will return to the flow space 53 carrying some of the abandoned solids, picking up raw water and chemical on the way and be recirculated through the mixing zone 50. Excess solids are removed to waste by means of the concentrator 60 and the sludge outlet 62. If desired the flow can be reversed through the mixing chamber, in which case the location of the water and chemical inlets would be changed to discharge into the mixing zone 50, as shown in Figures 1 and 2.

The apparatus shown in Figures 5 and 6 illustrates my invention when applied to an apparatus of the type described in my patent, Re. No. 22,194. In such an apparatus the tank 85 can be of any desirable shape but is shown for purposes of illustration as cylindrical and defined by vertical wall 86 and flat bottom 87. Treated water is withdrawn over a weir 14 into a launder 15 and thence to use through a conduit 16. A sludge outlet or drain 88, having a control valve 89, is shown leading from the lower part of tank 85.

Axially aligned in the tank is an agitator 90 which may comprise a shaft 91 journaled in suitable bearings, such as 92, and driven by a motor-reducer 28. Mounted on the shaft 91 are horizontal arms 93 upon which are carried suitable paddles 94. Preferably the upper portion of the shaft 91 is encased in a cylindrical tube 95 to prevent agitation of the water in the clarified water zone 51.

A plurality of substantially vertical baffles 100 are placed radially in the tank 85, above the agitator paddles 94, in order to reduce, but preferably not entirely destroy, the rotational movement of liquid established and maintained by rotation of the agitator 90. Superimposed upon the vertical baffles 100 are a plurality of narrow sloping settling plates 101 which may be concentric conical segments as shown in Figure 6, or radial baffle plates as arranged in Figures 1 and 2. If the settling plates are in radial position, the baffles 100 may be omitted. The vertical baffles 100 and the superimposed settling plates 101 functionally divide the tank 85 into a lower reaction space and an upper clarified water space separated by the clarification space 52 at the level of the settling plates. A solids separating chamber 102 may be placed within the tank preferably centrally located with its upper edge 103 preferably above the level of the lower edge 104 of the sloping baffle plates and below the upper edge 105 thereof. A solids outlet 106 leads from the lower portion of the solids separator 102, and flow therethrough will preferably be controlled by some suitable valve, such as 107.

Water and chemical reagent can be introduced in any desired location, such as through water inlet 110 and chemical feed line 111.

In operation of this type of apparatus a body of slurry is maintained in the lower portion of the tank 85, extending to a level intermediate the top edge 105 and the bottom edge 104 of the sloping sedimentation plates 101. Water is introduced through inlet conduit 110, and a chemical reagent through chemical feed line 111, and the two are thoroughly mixed in and with the slurry in the bottom portion of the tank by rotation of the agitator 90. After rising a suitable distance the rotational movement of the water is reduced by vertical baffles 100. The upward flow of water is then deflected by the sloping plates 101 into a plurality of narrow streams rising diagonally, whereby the solids may be readily deposited upon the sloping plates 101 and flow as a thin sludge or slide down to be resuspended in the slurry below. Clarified water will rise from the clarification zone 52, and after rising through the clarified liquid zone 51, will be withdrawn to use over weir 14.

In structures of the kind shown herein, the depth of the clarified liquid zone can be substantially less than that heretofore required. Preferably water clarified in the clarification zone 52 will be allowed a short free rise through a clarified liquid zone 51. In the past such a clarified liquid zone was maintained for a depth of several feet below the weir 14 in order to permit the substantially complete separation of solid particles from the liquid. Such a depth is required as I have found that with a stagnant condition of the slurry at the interface between the slurry body and the overlying clear liquid, the slurry or particles at the interface tend to disintegrate and rise with the rising clear water. By means of the sloping plates herein described, there is a continuous and substantial separation of solids from the slurry adjacent the upper limits thereof, which solids are not removed from the process but only temporarily removed from the area where they are most apt to cause difficulty. This provides for a constant return of solids from the interface between the slurry and clear water to the mixing space for reconditioning and growth. When the plates are arranged as herein described as preferred forms, the depth of the clarified liquid zone can be much less than heretofore, as, due to the return of the slurry particles to the mixing zone, there is less tendency of the solid particles in the slurry to disintegrate and rise with the clear water.

The term "water" used herein and in the claims is intended to cover aqueous solutions of all kinds, such as, by way of illustration and not of limitation, water, waste waters, saline solutions such as brine and sea water, and other solutions of inorganic or organic substances in water. The term "slurry" is used in the sense in which it is coming to be used in the art, namely, a suspension of water being treated and a quantity of solids accumulated from previously treated water several times greater than that contained in, or forming in, an equal quantity of water entering to be treated. The term "slurry process" or "slurry type treatment" or "slurry type process" is used to indicate a process in which a slurry is used for treating water, that is, one in which water and reagents are mixed and reacted in and with a slurry.

Obviously, there are many modifications of the invention herein described which will be obvious to those familiar with the art so that the figures and specification herein are to be considered for purposes of illustration rather than of limitation.

I claim:

1. A slurry type water treating apparatus wherein water and a precipitating reagent are mixed in a pool of slurry having a clearly defined upper surface from which clear water escapes comprising a tank having a clarified water outlet from its upper portion, a plurality of steeply sloping settling plates extending horizontally across the cross-sectional area of said tank at an intermediate level therein vertically spaced below said clarified water outlet, said plates functionally separating said tank into a reaction space in the lower portion of said tank and a clarified water space overlying said reaction space, means for supplying water and a reagent into the reaction space, a solids outlet at a level below said clarified water outlet, and means to cause a horizontal flow of slurry along said plates, said means including a mechanically driven liquid moving member in said reaction space, a partition structure surrounding said liquid moving member and extending from adjacent the bottom of said tank to adjacent the level of said settling plates, and a motor operatively joined to said liquid moving member.

2. Apparatus as described in claim 1 wherein the settling plates slope at an angle from the horizontal of about 45° or more.

3. Apparatus as described in claim 1 wherein the horizontal distance between adjacent settling plates is less than the vertical height of said plates.

4. Apparatus as described in claim 1 wherein the settling plates are of such width and so positioned that the upper edge of one plate extends over the lower edge of an adjoining plate.

5. In a slurry type water treating apparatus that includes a tank, a partition structure in said tank forming therein an agitation space and a quiescent space having a zone of clarified water in an upper portion thereof, a treated water outlet leading from the upper part of said quiescent space, means for delivering water to be treated and a treating reagent into the agitation space, a power driven slurry moving member positioned in said agitation space, and a solids outlet from said tank, the combination which comprises a plurality of sloping, horizontally extending and laterally spaced plates extending across the cross-sectional area of said quiescent space, and a passageway affording communication between the agitation space and the spaces between said plates, said passageway opening horizontally into said last mentioned spaces whereby slurry passes horizontally along said plates.

6. Water treating apparatus comprising a tank, a mechanically driven stream projecting impeller in said tank, a partition structure surrounding said impeller and extending upwardly from adjacent the bottom to adjacent the top of said tank, a lateral opening in said partition at an intermediate level therein, a plurality of horizontally spaced horizontally extending sloping plates in said tank, said plates covering the area between said partition structure and the periphery of said tank at the level of said opening, means for withdrawing treated water from the upper portion of said tank, means for the delivery of water and a treating reagent into the tank at a level below said plates, and a solids outlet from said tank.

7. Apparatus as described in claim 6 wherein the sloping plates are arranged concentrically in said tank.

8. Apparatus as described in claim 6 wherein the sloping plates are arranged radially in said tank.

9. In water treating apparatus of the type wherein treatment is applied to water in a slurry containing solids separated and accumulated from previously treated water and clarified water escapes from the upper surface of the slurry, said apparatus comprising a tank, an opening through which water to be treated is supplied into the tank, means for delivering reagent to the water to be treated, an outlet for treated water adjacent the top of the tank, a solids discharge outlet from the tank, a plurality of laterally spaced horizontally inclined sloping settling plates supported in said tank at a level below the treated water outlet, improved means for delivering slurry into the spaces between said plates, said means comprising a partition structure extending vertically in said tank from adjacent the bottom thereof to adjacent the top thereof and enclosing a flow space, an opening in the side of said structure at the level of and adjacent ends of said plates and power means for causing flow of slurry through said opening and said flow space.

10. A water treating apparatus of the type wherein treatment is applied to water in a slurry containing particles separated and accumulated from previously treated water and clarified water rises abruptly from the upper surface of the slurry, comprising a tank, a wall structure in said tank dividing the same into a mixing space and a quiescent space, a clarified water outlet at the upper end of said quiescent space, a solids discharge opening from said tank, a shaft in said mixing space, a liquid impelling member mounted on said shaft, a motor connected to said shaft, an inlet for introducing water to be treated into said mixing space, a conduit for delivering reagent to the water to be treated, a plurality of laterally spaced inclined settling plates mounted in and extending horizontally across said quiescent space at an intermediate level therein, and a passageway between said mixing space and said quiescent space below the level of the top of such settling plates.

11. In water treating apparatus comprising a tank, said tank having inlet means for delivering water to be treated and a treating reagent into the lower portion thereof and treated water discharge means adjacent the top thereof, an agitator for producing a rotary motion of liquid in the lower portion of the tank and over substantially the whole area thereof, baffle members located over said agitator and so arranged as to diminish said rotary motion, and a solids separator having an inlet opening adjacent said baffle members, the combination with said baffle members of a plurality of sloping settling plates above said baffle members.

12. Water treating apparatus of the type wherein there is maintained a pool of slurry from the upper surface of which slurry clear water escapes comprising a tank, a lower portion of which forms a slurry holding space and an upper portion of which is a clarified water space, a mechanically driven stream projecting impeller in said tank, a partition structure surrounding said impeller and extending upwardly from adjacent the bottom of said tank to adjacent the top thereof, a lateral opening in said partition structure at an intermediate level in said tank, a plurality of sloping plates extending concentrically in said tank around said partition at the level of said opening, a flow member extending horizontally from said opening in said partition toward the wall of said tank, lateral openings in said flow member so constructed and arranged as to provide communication between said flow member and the spaces between adjoining plates, an inlet for water to be treated into the slurry holding space, an inlet for delivery of a treating reagent to the water to be treated, a solids outlet from said tank, and an outlet for treated water from the upper portion of said tank, said inlets being vertically spaced below said outlet for treated water.

13. In water treating apparatus of the type wherein there is maintained a pool of slurry from the upper surface of which slurry clear water escapes, said apparatus comprising a tank, the lower portion of which forms a slurry holding space and the upper portion a clarified water space, a clarified water outlet from the upper portion of said tank, a waste discharge from said tank, means for delivering water to be treated and a treating reagent to within said slurry holding space, and a power driven slurry moving member positioned within the said slurry holding space, means for conditioning the surface layer of slurry to favor escape of clarified water therefrom, said means comprising a series of sloping, horizontally extending laterally spaced plates positioned in said tank at such an elevation as to penetrate the normal slurry surface during operation, the width of said plates being such that the top and bottom edges of adjacent plates overlap, whereby the slurry adjacent said surface layer is subdivided and confined in a plurality of relatively narrow sloping flow passages.

14. A method of treating water which comprises maintaining a body of slurry accumulated from previously treated water, circulating slurry through a cyclic path which includes a flow from the lower portion of said body to adjacent the upper surface thereof, passing the flow of slurry adjacent the upper surface horizontally into a plurality of narrow passageways defined laterally by sloping surfaces and open at top and bottom, whereby solids may be deposited upon such surfaces and slide downwardly thereon, returning a portion of such slurry downwardly into the lower portion of the body of slurry, mixing water to be treated and treating reagent in said circulating slurry, separating clarified water from said slurry in said passageways, withdrawing said clarified water from above said body of slurry, and withdrawing solids from the said body of slurry.

15. A method of treating water which comprises maintaining a body of slurry accumulated from previously treated water, mixing water to be treated and a treating reagent in and with said slurry, separating clarified water from the upper surface of said slurry, withdrawing said clarified water from above said body of slurry and withdrawing excess solids from said body of slurry, characterized by the steps of maintaining a circulation in said body of slurry from the bottom to the upper surface of said slurry, thence horizontally and finally returning to the lower portion of said body, dividing said horizontal flow into a plurality of shallow, thin and diagonally rising streams, separating an output portion of clarified water from said streams, and returning slurry and solids from said streams to the body of slurry.

16. A slurry type water treating process which comprises maintaining a body of water undergoing treatment, said body of water being divided into a lower body of slurry and an upper body of clarified water with a clear water escape surface therebetween, introducing water to be treated and a precipitating reagent into said body of slurry, withdrawing treated water from said body of clarified water, and withdrawing excess solids to waste from said slurry, characterized by the steps of applying energy to maintain a flow of water to and through said clear water escape surface, subdividing said flow of water into a plurality of shallow streams whose direction of flow has a major horizontal component and underlying each stream with a steeply sloping solids receiving surface, whereby escape of clear water from said clear water escape surface is promoted.

17. The process of treating water to effect separation of the water and solid particles which comprises the steps of establishing a single vertical generally cylindrically and uniformly rising column of water undergoing treatment substantially free of obstructions which restrict vertical flow, delivering water to be treated into the lower portion of said column, accumulating in said lower portion of the column solids from previously treated water to form a slurry, agitating the slurry in the lower portion of said column to produce a movement having a major rotational component to maintain in suspension substantially all solids therein, reducing the rotational movement of the slurry rising out of the zone of agitation to create a region of relative quiescence in the upper portion of said column, withdrawing solids to waste from the slurry rising in a portion of said region of relative quiescence and withdrawing treated water from said column above the level of solids withdrawal, deflecting the slurry rising out of the zone of agitation into the zone of relative quiescence in a direction that has a horizontal component greater than its vertical and dividing it into a plurality of shallow streams, defined laterally by sloping surfaces and open at top and bottom, whereby solids may be deposited upon such surfaces and slide downwardly thereon.

18. In a slurry type water treating process wherein water and reagent is mixed in and with a body of slurry containing suspended solids accumulated from previously treated water and clarified water separates from the upper surface of said body of slurry, the steps of applying mechanical impelling energy to maintain a circulation in said body of slurry including a horizontal flow adjacent the slurry surface, dividing said horizontal flow into a plurality of shallow thin streams rising to said surface in a direction having a predominantly horizontal component, separating clarified water and solids in said streams of slurry, returning solids by gravity to a lower portion of said body of slurry, and withdrawing the clarified water from above said slurry surface.

WALTER H. GREEN.

REFERENCES CITED

The following references are of record in the file of this patent:

UNITED STATES PATENTS

| Number | Name | Date |
| --- | --- | --- |
| 748,308 | Reisert | Dec. 29, 1903 |
| 2,245,583 | Green | June 17, 1941 |
| 2,296,437 | Green | Sept. 27, 1942 |
| 1,177,849 | Kalb | Apr. 4, 1916 |
| 1,030,366 | Winters | June 25, 1912 |
| 2,021,672 | Spaulding | Nov. 19, 1935 |
| 2,127,314 | Spaulding | Aug. 16, 1938 |
| 2,245,587 | Hughes | June 17, 1941 |
| 1,701,068 | Flowers | Feb. 5, 1929 |
| 1,009,857 | Reisert | Nov. 28, 1911 |
| 2,259,221 | Darby et al. | Oct. 14, 1941 |
| 1,864,866 | Snow | June 28, 1932 |
| 495,313 | Dervaux | Apr. 11, 1893 |
| 2,179,246 | Applebaum | Nov. 7, 1939 |
| 2,314,977 | Green | Mar. 30, 1943 |
| 2,348,122 | Green | May 2, 1944 |

FOREIGN PATENTS

| Number | Country | Date |
| --- | --- | --- |
| 2,077 | Great Britain | Jan. 29, 1908 |
| 57,727 | Germany | July 30, 1889 |